United States Patent Office 3,441,534
Patented Apr. 29, 1969

3,441,534
CURABLE COMPOSITIONS
Edgar W. Knaub, Schenectady, N.Y., assignor to General
Electric Company, a corporation of New York
No Drawing. Filed Jan. 3, 1966, Ser. No. 517,921
Int. Cl. C08g 47/10
U.S. Cl. 260—37                         10 Claims

ABSTRACT OF THE DISCLOSURE

Room temperature vulcanizing compositions are provided in the form of blends of organopolysiloxane polymers and organic polymers, such as polyethers or polyesters. The various polymers have chemically combined organosilyl radicals with hydrolyzable radicals, such as acyloxy, ketoximator and amino radicals attached to silicon. The subject compositions are useful as sealants and caulking compounds.

---

The present invention relates to room temperature vulcanizing compositions convertible to elastomeric products comprising chemically combined organopolysiloxane polymer and organic polymer.

Room temperature vulcanizing organopolysiloxanes such as shown in Ceyzeriat Patent 3,133,891 provide for significant advantages over conventional heat-cured organopolysiloxane polymers. As a result of the increased utility and versatility of these room temperature vulcanizing materials, they are utilized in a variety of applications such as construction sealants, caulking compounds, bathtub sealants, etc. Organopolysiloxane compositions vulcanizable at room temperature also can provide for products having significant advantages over materials produced from room temperature vulcanizable organic compositions such as shown in British Patent 971,692. Those skilled in the art know for example, that even though organopolysiloxane elastomers have outstanding heat stability and low temperature flexibility, in particular applications room temperature vulcanizing organopolysiloxanes sometimes form elastomers having disadvantages which are not shown by the comparable organic sealants. For example, products made from room temperature vulcanizable organopolysiloxane compositions, such as caulking compounds cannot be readily painted with oil base or water base paints, and suffer from the problem of dirt pickup. In addition, organopolysiloxanes sealants often exhibit unsatisfactory adhesion to wood and other substrates. A further disadvantage of products made from room temperature vulcanizing organopolysiloxane compositions is a tendency to swell excessively when contacted with organic solvents and oils.

The present invention is based on the discovery that room temperature vulcanizable compositions comprising a blend of polymers having chemically combined radicals of the formula, (1) 

which polymers are selected from organopolysiloxanes and organic polymers defined hereinafter, provide for the production of paintable sealants and elastomeric products having reduced dirt pickup, improved adhesion to a variety of substrates and resistance to swell in organic solvents. R in Formula 1 is a monovalent organo radical free of aliphatic unsaturation selected from hydrocarbon radicals and halogenated hydrocarbon radicals, X is selected from halogen radicals, alkoxy radicals and Y radicals, Y is a monovalent radical selected from acyloxy radicals, ketoximato radicals, amino radicals, and aminoxy radicals, A is selected from oxygen and a polyvalent organo linkage, $a$ is a whole number equal to 0 to 2, inclusive, $b$ is an integer equal to 1 to 3, inclusive, $c$ is equal to 0 or 1, and the sum of $a$, $b$ and $c$ is equal to 3.

The room emperature vulcanizable compositions of the present invention also have significant advantages over conventional organic sealants and caulking compounds. For example, prior to cure, the compositions of the present invention are pourable at lower temperatures than comparable organic sealants. In addition, elastomeric products produced from the compositions of the present invention exhibit improved low temperature flexibility and superior heat stability as compared to similar products made from conventional organic sealants and caulking compounds.

In accordance with the present invention there is provided room temperature vulcanizable compositions comprising (A) 100 parts of organopolysiloxane consisting essentially of chemically combined units of the formula, (2)     $R'_2SiO$ (B) from about 5 parts to about 500 parts of organic polymer selected from polyesters, polyethers, aliphatically unsaturated hydrocarbon homopolymers, aliphatically unsaturated halogenated hydrocarbon homopolymers, aliphatically unsaturated organic copolymers, organopolysiloxane-polycarbonate copolymers, polycarbonate polymers and mixtures thereof, and (C) 0 to 100 parts of filler, where said organopolysiloxane polymer and said organic polymer have chemically combined radicals of Formula 1, where R' is selected from monovalent hydrocarbon radicals, halogenated monovalents hydrocarbon radicals and cyanoalkyl radicals.

Radicals included by R are for example, aryl radicals and halogenated aryl radicals, such as phenyl, chlorophenyl, naphthyl, etc.; aralkyl radicals such as benzyl, phenylethyl, etc.; saturated aliphatic, saturated haloaliphatic and saturated cycloaliphatic radicals such as alkyl, for example, methyl, ethyl, propyl, butyl, hexyl, heptyl, octyl, trifluoropropyl, etc., cyclobutyl, cyclohexyl, etc. Radicals included by R' are all of the aforementioned R radicals, aliphatically unsaturated radicals, such as vinyl, allyl, cyclohexenyl, etc., and cyanoalkyl radicals such as cyanoethyl, cyanopropyl, cyanobutyl, etc.

Some of the organopolysiloxane polymers having chemically combined radicals of Formula 1 and consisting essentially of chemically combined units of Formula 2 which can be utilized in the practice of the invention referred to hereinafter as "curable organopolysiloxane" can be made by effecting reaction between a silanol-terminated organopolysiloxane of the formula, (3) 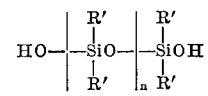

and a silane of the formula, (4) 

while maintaining substantially anhydrous conditions, where R, R', X, Y, $a$ and $c$ are as defined above, $d$ is an integer equal to 2 to 4, inclusive, the sum of $a$, $c$ and $d$ is equal to 4, and $n$ is an integer equal to 1 to 10,000, inclusive. Methods for making the silanol-terminated organopolysiloxane of Formula 3 are well known and are shown for example in Berridge, Patent 2,843,555 assigned to the same assignee as the present invention.

Included by the silanes of Formula 4 are for example, acyloxy silanes, for example, methyltriacetoxysilane as shown in the aforementioned patent of Ceyzeriat, aminoxy substituted silanes such as shown in copending application of R. A. Murphy, filed Jan. 4, 1965, Ser. No. 423,354 and assigned to the same assignee as the present invention, ketoximatosilanes such as shown in Russell et al. patent 3,184,427, etc., and amino silanes, as described in Nitzsche et al. Patent 3,032,528.

Organic polymers having terminal silyl radicals included by Formula 1 which can be mixed with the above-described curable organopolysiloxane polymer in accordance with the practice of the invention include for example polyethers and polyesters. Some of these room temperature vulcanizing polyethers and polyesters are shown in copending applications of Bruce A. Ashby, Ser. No. 463,877 filed June 14, 1965 and Ser. No. 482,943 filed Aug. 26, 1965, both assigned to the same assignee as the present invention. These room temperature vulcanizing materials can have terminal silyl radicals with hydrolyzable radicals, such as acyloxy, ketoximato, halogen, aminoxy, etc., attached to silicon. The silyl radicals can be joined to the organic polymer by a linkage such as a urethane, carbonate, ester, ether, etc.

Other room temperature vulcanizing organic polymers which can be utilized to provide for the production of the compositions of the present invention are shown in the copending application of Bruce A. Ashby, Ser. No. 482,885 filed Aug. 26, 1965 and directed to aliphatically unsaturated organic polymers such as homopolymers of butadiene, isoprene or chloroprene and copolymers thereof with acrylonitrile or styrene having chemically combined silyl radicals included by Formula 1.

In addition to the aforementioned room temperature vulcanizable materials there also can be utilized as room temperature vulcanizable organic polymer in combination with the curable organopolysiloxane polymer consisting essentially of chemically combined units of Formula 2, organopolysiloxane polycarbonate copolymers as shown in copending application Ser. No. 517,909 of Howard A. Vaughn, Jr., filed concurrently herewith. These organopolysiloxane-polycarbonate copolymers have chemically combined radicals included by Formula 1 and can contain from 1 percent to 95 percent by weight of organopolysiloxane based on the weight of copolymer.

A more detailed description of some of the above-mentioned room temperature vulcanizable organic polymers which can be utilized in combination with the curable organopolysiloxane polymer of the present invention, can be found in the disclosures of the aforementioned copending application which are incorporated herein by reference.

The organic polymer utilized in the practice of the present invention having chemically combined silyl radicals of Formula 1, hereinafter referred to as the "curable organic polymer," can have silyl radicals of Formula 1 chemically bonded by a linkage such as a carbon-silicon, an organoether, organoester, organourethane, organocarbonate, etc. For example, there are included linkages such as QD,

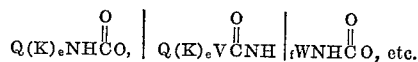

where Q is a radical of the formula, (5)

D is a member selected from

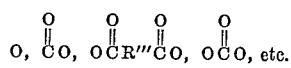

K is selected from $R'''$ and a divalent ether radical having the characteristic group $R'''$, $OR'''$, $R''$ is selected from divalent hydrocarbon radicals and halogenated divalent hydrocarbon radicals, $R''$ is a member selected from hydrogen, monovalent hydrocarbon radicals and halogenated monovalent hydrocarbon radicals, V is a member selected from —O—, —S—, and —NR''—, W is a polyvalent hydrocarbon radical having a valence of at least 2, $e$ is a whole number equal to 0 or 1, $f$ is an integer equal to 1 or 2, and one less than the valence of W,

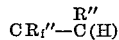

can be part of an aliphatic or cycloaliphatic radical.

Radicals included by $R''$ are alkylene, for example, methylene, ethylene, trimethylene; haloalkylene such as chloroisopropylene, fluorobutylene, etc., arylene such as phenylene, naphthalene, etc.; haloalkylene such as chlorophenylene, alkylenearylene such as ethylenephenylene, etc. Radicals included by K are for example, $R'''$ radicals and alkyleneoxyarylene radicals such as ethyleneoxyphenylene, etc., alkyleneoxyarylene such as ethyleneoxypropylene, etc., aryleneoxyarylene such as phenyleneoxyphenylene, etc., Radicals included by W and $R'''$ radicals and polyvalent radicals such as

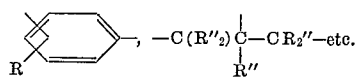

Divalent cycloalkane radicals to which the silyl radicals of formula 1 can be attached include for example, divalent cyclobutane, divalent cyclopentane, divalent cyclohexane, etc.

Radicals included by X of Formula 1 are more particularly methoxy, ethoxy, propoxy, tert-butoxy, etc.; halogen radical such as chloro, bromo, iodo, etc. Radicals included by Y are for example, acyloxy such as formoxy, acetoxy, propionoxy, etc., aminoxy such as methylethylaminoxy, diethylaminoxy etc. Ketoximato such as dimethylketoximato, diethylketoximato, etc. In the above formulae where R, R', R'', R''', W, X and Y can represent more than one radical respectively, these radicals can be all the same or any two or more of the aforementioned radicals.

Some of the curable organic polymer of the present invention can be made by effecting reaction between organic polymer containing olefinic unsaturation or acetylenic unsaturation referred to hereinafter as the "aliphatically unsaturated organic polymer" and a silicon hydride of the formula, (6)

where R, Y, X, $a$, $b$ and $c$ are as defined above.

Some of the aliphatically unsaturated organic polymer includes polymer such as polyether, polyester, etc., having terminal olefinic or acetylenic unsaturation which can be introduced by utilizing unsaturated compounds of the formula, (7)

in combination with polyfunctional compounds such as polyisocyanates, polybasic acids, where R, $R'''$, V and $f$ are as defined above, for example, V can be —O—, —S—, — etc., $g$ can be 0 or 1,

can be part of an unsaturated aliphatic radical such as an acetylenic or olefinic radical, or unsaturated cycloaliphatic radical. In particular instances, aliphatically unsaturated organic polymer can be made by reacting olefinically unsaturated material such as alkenyl and cycloalkenyl isocyanates directly with organic polymer having reactive hydrogen atoms such as organic polymer having chemically combined hydroxy radicals.

The polyethers and polyesters which can be employed to make the aliphatically unsaturated organic polymer utilized in the production of the room temperature vulcanizing compositions of the present invention are well known commercially available materials. These polyesters and polyethers have terminal hydroxy radicals. The polyethers which can be utilized consist essentially of chemically combined alkyleneoxy units such as taught on pages 32–44 of Polyurethanes Chemistry and Technology, J. H. Saunders and K. C. Fritch, Interscience Publishers, New York (1962). Polyethers which can be employed can be made from source materials such as ethylene oxide, propylene oxide epichlorohydrin, tetrahydrofuran, etc. For example, one procedure which can be used is to effect reaction between propylene oxide, epichlorohydrin, etc., and an alkylene glycol, such as propylene glycol, or a fluorinated alkylene glycol, etc. in the presence of a base catalyst, such as anhydrous sodium hydroxide. Some of the chemically combined units which can be present in the polyethers utilized in the practice of the invention are for example,

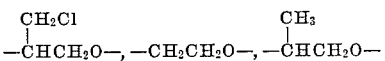

$-CH_2CH_2CH_2O-$, $-CH_2CF_2CF_2CH_2O-$, $C_nH_{2n}O$, etc., where $n$ is an integer equal to 2 to 6, inclusive, and preferably 2 to 4. Of the polyalkylene ethers, polypropylene ether is preferred. Polyether having a molecular weight of between 300 to 12,000, and preferably 1,000 to 2,000 can be utilized. Viscosities up to $2\times10^6$ centipoises at 25° C. can be employed in the practice of the invention.

Polyester which can be utilized in the practice of the invention consists essentially of chemically combined

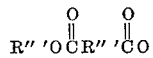

units and can be linear or branched. The polyester can be produced by effecting reaction between a polycarboxylic acid and a polyglycol. The polyester can have terminal radicals selected from hydroxy radicals or a mixture of hydroxy and carboxy radicals. Some of the polycarboxylic acids which can be employed in making the polyesters operable in the invention are oxalic acid, malonic acid, succinic acid, glutaric acid, adipic acid, palmitic acid, suberic acid, azelaic acid, sebacic acid, phthallic acid, isophthallic acid, terephthallic acid, halogenated phthallic acid, etc. Glycols which can be employed to make the polyesters utilized in the practice of the invention include 1,4 - cyclohexanedicarbinol, ethylene glycol, diethylene glycol, triethylene glycol, etc., propylene glycol, 1,3-butylene glycol, 1,4-butylene glycol, isomers of dihydroxybenzene, bisphenols, such as diphenylolpropane, halogenated bisphenols, etc. Mixtures of glycols and triols, such as glycerine, 1,2,6 - hexanetriol, trimethylolpropane, pentaerythritol, etc., also can be employed in combination with any one or more of the aforementioned acids. Esterifications and transesterification methods for making these polyesters are well known. A method which can be employed is described on pages 45–48 of "Polyurethanes Chemistry and Technology" as previously cited. Organic polymer having terminal hydroxy radicals, or a mixture of hydroxy and carboxy radicals also can be employed consisting of blocks of polyglycol, polyester or mixtures thereof joined by urethane linkages.

Aliphatically unsaturated organic polymer which also can be utilized in the practice of the invention includes organic polymer resulting from the polymerization of homopolymers of the o diolefin of the formula,

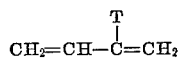

where T is a member selected from hydrogen, methyl and chloro and copolymerization of said diolefin and a member selected from styrene and acrylonitrile. Well known methods of polymerizing or copolymerizing mixtures of aliphatically unsaturated hydrocarbon monomers can be employed. For example, there can be utilized butadiene, isoprene, chloroprene, styrene, and organic materials such as acrylonitrile, etc., where the mixtures polymerized or copolymerized contain at least 50 mole percent of butadiene or butadiene derivatives such as isoprene or chloroprene. These aliphtically unsaturated organic polymers can have viscosities in the range of about 10,000 centipoises to 600,000 centipoises at 25° C., and a molecular weight in the range of between 1000 to 5000. Standard procedures of homopolymerization and copolymerization can be utilized as shown in Preparative Methods of Polymer Chemistry by W. R. Sorensen and T. W. Campbell, pages 216 to 224, Interscience Publishers, Inc., New York (1961). Preferably, the aliphatically unsaturated organic polymer is a copolymer of butadiene and styrene.

In addition to the above-described aliphatically unsaturated organic polymer, the present invention also includes commercially available aliphatically unsaturated organic polymer having hydroxy radicals attached to carbon, in addition to containing aliphatic unsaturation. Depending upon the average moleculer weight of the aliphatically unsaturated organic polymer, the proportion of hydroxy radicals per polymer molecule will vary. Experience has shown that aliphatically unsaturated organic polymers having an average of about two or three hydroxy radicals per polymer molecule provide for optimum results.

Organopolysiloxane - polycarbonate block copolymers having terminal aliphatically unsaturated radicals which can be employed to make the curable organic polymer by effecting reaction with the silicon hydride of Formula 6 can be made by the method shown in the copending application of Howard A. Vaughn, Jr. referred to above. For example, a mixture of a dihydroxy compound of the formula, (8)            HOZOH an organopolysiloxane of the formula, (9)
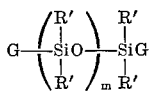

and an aliphatically unsaturated compound included by Formula 7 is phosgenated, where R' is as previously defined, Z is a divalent radical which includes R''' as previously defined,

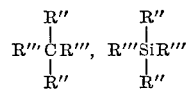

divalent cycloaliphatic radicals, divalent oxyaryleneoxy radicals, sulfonyl, sulfinyl, oxy, thio, etc. For example, Z in the above formula can be

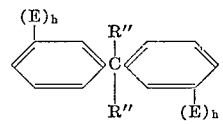

where E is selected from halogen and alkyl radicals and $h$ is equal to 0 to 4, inclusive. G in the above formula can be selected from $-OZOH$, $-R'''OH$,

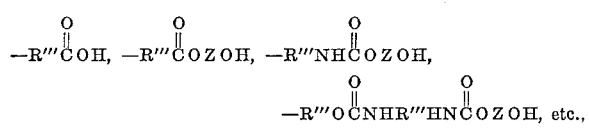

and $m$ is an integer equal to 1 to 500, inclusive.

In addition to the above-described organopolysiloxane-polycarbonate copolymers of H. A. Vaughn, Jr., there also can be utilized in the practice of the invention polycarbonate having terminals radicals of Formula 1. In addition, copolymers also can be utilized composed of polycarbonate blocks joined to each other by siloxy units. Methods for making these curable organic polymers include phosgenation of mixtures of dihydroxy compounds of Formula 8 in the presence of sufficient aliphatically unsaturated compounds of Formula 7 in accordance with the block size desired. If polycarbonate blocks are desired joined by siloxy units, the procedure of Goldberg Patent 2,999,845 assigned to the same assignee as the present invention can be employed. The resulting aliphatically unsaturated polymers can then be converted to the curable organic polymers of the present invention by effecting addition of the silicon hydrides of Formula 6.

Additional organo polymer having chemically combined radicals of Formula 1 which can be utilized in the practice of the invention include polysulfides, polysulfones, polyamides, polyimides, etc.

As shown in the aforementioned copending applications of H. A. Vaughn, Jr., some of the organopolysiloxanes of Formula 9 can be made by effecting reaction between halogen terminated diorganopolysiloxane and a bisphenol in the presence of a base such as pyridine. Other methods which can be utilized for making organopolysiloxane included by Formula 9 are by equilibrating cyclopolysiloxane such as octamethylcyclotetrasiloxane with 2,2-diorgano-1-oxa-2-silacycloalkanes such as 2,2-dimethyl-1-oxa-2-silacyclohexane, etc., as shown in Knoth Patent 2,983,744.

Included by the dihydroxy compounds of Formula 8 are bisphenols such as 2,2-bis(4-hydroxyphenyl)propane (Bisphenol-A); 2,4'-dihydroxydiphenylmethane; bis(2-hydroxyphenyl)methane; bis(4-hydroxyphenyl)methane; 1,1 - bis(4-hydroxyphenyl)ethane; 1,2 - bis(4 - hydroxyphenyl)ethane; 1,1-bis(4-hydroxy-2-chlorophenyl)ethane; 1,1-bis(2,5-dimethyl-4-hydroxyphenyl)ethane; 1,3-bis(3-methyl-4-hydroxyphenyl)propane; 2,2-bis(3-isopropyl-4-hydroxyphenyl)propane, etc.

There are included by Formula 4 acyloxy silanes such as, $$CH_3Si(OCCH_3)_3, \ CH_3-Si(OCH)_3, \ C_6H_5Si(OCCH_3)_3,$$

$$C_2H_5Si(OCCH_3)_3, \ Si(OCCH_3)_4, \ etc.$$

ketoximatosilanes which are included are for example, $$CH_3Si[ONC(CH_3)_2]_3, \ C_2H_5Si[ONC(C_2H_5)_2]_3,$$
$$CH_3Si[ONC(CH_3)(C_2H_5)]_3, \ C_6H_5Si[ONC(CH_3)_2]_3,$$

aminoxysilanes, such as, $$CH_3Si[ON(C_2H_5)_2]_3, \ Si[ON(C_3H_7)_2]_4,$$

$$CH_3Si\left[ON\begin{array}{c}CH_2-CH_2\\ \\ CH_2-CH_2\end{array}\right]_3, \ CH_3Si\left[\begin{array}{c}CH_3\\ |\\ OSiON(C_2H_5)_2\\ |\\ CH_3\end{array}\right]_3, \ etc.$$

aminosilanes which are included are, $$CH_3Si[N(CH_3)_2]_3, \ Si[N(CH_3)_2]_4$$
$$C_6H_5Si[N(C_2H_5)_2]_3, \ CH_3Si[N(CH_3)_2]_3.$$

Silicon hydrides included by Formula 6 are for example, acyloxysilanes such as, $$HSi(CH_3)_2(OCCH_3), \ HSi(C_2H_5)(OCCH_3)_2, \ HSi(OCC_2H_5)_3,$$
$$HSiCH_3(OCCH_3)_2, \ HSiCH_3(OCC_2H_5)_2, \ HSi(OCCH_3)_3,$$
$$HSiCH_3(OCH)_2, \ etc.$$

ketoximatosilanes such as, $$HSiCH_3[ONC(CH_3)(C_2H_5)]_2,$$
$$HSi(CH_3)_2[ONC(CH_3)(C_2H_5)],$$
$$Hsi[ONC(CH_3)(CH_2H_5)]_3, \ HSiCH_3[ONC(CH_3)_2]_2, \ etc.;$$

Aliphatically unsaturated isocyanates which can be utilized to provide for the production of the aliphatically unsaturated organic polymer are $$CH_2=CHN\overset{O}{\overset{\|}{C}}, \ CH_2=CH\overset{O}{\overset{\|}{\langle\ \rangle}}N\overset{O}{\overset{\|}{C}}, \ CH_2=CHCH_2N\overset{O}{\overset{\|}{C}},$$

$$CH_2=CHCH_2\overset{O}{\overset{\|}{\langle\ \rangle}}N\overset{O}{\overset{\|}{C}}, \ CH_2=CH(CH_2)_2N\overset{O}{\overset{\|}{C}},$$

$$\begin{array}{c}CH-CH_2\\ \| \\ CH-CH_2\end{array}CHN\overset{O}{\overset{\|}{C}}, \ CH_2=CHCH_2O\overset{O}{\overset{\|}{\langle\ \rangle}}N\overset{O}{\overset{\|}{C}}.$$

Some of the aliphatically unsaturated compounds included by Formula 7 which can be utilized in combination with polyisocyanates and organic polymer such as polyether and polyester are for example, $$CH_2=CH-CH_2OH, \ CH_2=CH-CH_2-CH_2OH,$$
$$CH_3-CH=CH-CH_2OH, \ CH\equiv CH-CH_2OH,$$

$$\langle\ \rangle-OH, \ HC\equiv C-\overset{OH}{\overset{|}{C}H}-C_4H_9,$$

$$CH_2=CH-\overset{OH}{\overset{|}{C}H}-CH_2CH_3, \ (CH_3)_2C=CH(CH_2)_2-\overset{}{\underset{OH}{C}}(CH_2)CH=CH_2$$

$$\underset{OCH_2CH=CH_2}{\overset{OH}{\langle\ \rangle}}, \ \overset{OH}{\langle\ \rangle}\overset{CH_2-CH=CH_2}{}$$

$$CH_2=CHCH_2SH, \ CH_2=CHCH_2NH_2, \ etc.$$

The room temperature vulcanizing compositions of the present invention preferably contain from 15 to 100 parts of curable organic polymer and from 10 to 40 parts of filler per 100 parts of curable organopolysiloxane. Such fillers as silica fillers, for example, fume silica, precipitated silica, silica aerogel, etc., can be utilized. In addition, non-reinforcing fillers such as carbon black, zinc oxide, diatomaceous earth, etc. also can be employed. In addition, pigments, plasticizers, heat-age additives also can be used in combination with the curable composition.

The curable compositions of the present invention can be utilized in construction and sealant applications such as caulking compounds, bathtub sealants, marine sealants, automobile sealants, etc.

Addition of the silicon hydride of Formula 6 to the aliphatically unsaturated organic polymer can be effected at temperatures in the range of between 20° C. to 200° C. The addition is preferably accomplished in the presence of a platinum catalyst, for example, in the form of a platinum-olefin complex as shown in Ashby Patent 3,159,601, or in the form a platinum-alcoholate complex as shown in Lamoreaux Patent 3,220,972 which are both assigned to the same assignee as the present invention.

In the practice of the invention the curable organic polymer is blended with the curable organopolysiloxane under substantially anhydrous conditions and optionally with material such as filler, etc. until a uniform mixture is achieved.

Depending upon the viscosity of the mixture at the temperature utilized during the blending of the various components, the type of apparatus utilized for blending can vary. In order to insure a uniform mixture as well as minimize the separation of components during the shelf period, the mixture should be sufficiently agitated. Providing there are no more than 100 parts of water per million parts of mixture, experience has shown that the shelf life of the mixture can be maintained for periods greater than 6 months at temperatures between 0° C. to 40° C. A satisfactory shelf life indicates that the room temperature vulcanizing composition will cure under atmospheric conditions in a period of at least 72 hours or less.

In order that those skilled in the art will be better able to practice the present invention, the following examples are given by way of illustration and not by way of limitation. All parts are by weight.

Example 1

There were added 657.5 parts of 2,4-toluenedi-isocyanate to a mixture of 2500 parts of a polypropylene ether having a molecular weight of about 1300 while the temperature was maintained between 100° C. to 105° C. during the addition. After the addition was completed, the mixture was heated for an additional hour at 100° C. and 0.25 part of dibutyltindilaurate was added followed by 218.8 parts of allyl alcohol. When the infrared spectrum of the mixture showed the absence of isocyanate, there were added to the mixture, 2.2 parts of chloroplatinic acid-octyl alcohol complex. The mixture was then heated an additional hour and toluene was removed under reduced presure. Based on method of preparation, there was obtained a polypropylene ether having terminal diacetoxymethylsilyl radicals joined to the polypropylene ether through urethane linkages.

A mixture of 286 parts of the above diacetoxymethylsilyl-terminated polypropylene ether and 24 parts of fume silica was blended with 100 parts of a polydimethylsiloxane consisting essentially of about 250 chemically combined dimethylsiloxy units having terminal methyldiacetoxysiloxy units. The blending was performed under substantially anhydrous conditions. There also were utilized in the mixture, 15 parts of a silanol containing process aid composed of about 19.9 moles of methylsiloxy units chemically combined with 77.2 moles of dimethylsiloxy units and 2.9 moles of trimethylsiloxy units. It also had about 0.5 percent by weight of hydroxy radicals attached to silicon based on the total weight of chemically combined siloxy units. Based on method of preparation, there was obtained a curable composition comprising a blend of 286 parts of the curable polyether and 24 parts of fume silica, per 100 parts of the curable polydimethylsiloxane.

A portion of the above curable composition was poured onto a tin-plated steel panel and exposed to the atmosphere. A tack-free product was obtained after 1 hour. After 8 days a slab was cut from the resulting cured film. It showed a tensile of 409 p.s.i., an elongation of 68 percent and a hardness of 62 (Shore A). After being immersed in astm oil No. 3 for 4 days at 27° C., the slab swelled 5 percent of its original length. Under similar test conditions, a slab made from the above-described curable polydimethylsiloxane swelled to 12 percent of its original length.

Cured slabs obtained from the curable composition and curable polydimethylsiloxane are painted with an acrylic paint. After the paint drys on the slabs, a pressure sensitive adhesive tape is applied manually to each of the painted slabs. The tape is then separated quickly from each of the slabs. It is noted that the paint readily separates from the surface of the treated organopolysiloxane slab. The slab made from the blend of curable polydimethylsiloxane and curable polyether has to be scraped with a spatula before all the paint is removed.

Example 2

There were added 204.5 parts of allyl isocyanate to a mixture of 2500 parts of a polyester of diethylene glycol and adipic acid having a molecular weight of about 3000, and 1000 parts of toluene while the temperature of the mixture was maintained at 100° C. The mixutre was heatetd for about 5 hours while maintaining the temperature at 100° C. during which time 0.4 part of dibutyltindilaurate was added. Based on method of preparation there was obtained a polyester having terminal allylurethane linkages. There were then added to the aforementioned mixture at a temperature of 100° C., 400 parts of methyldiacetoxysilane and 0.01 part of platinum metal in the form of a platinum-alcoholate complex. The mixture was heated for an hour and then it was stripped of toluene by heating it to 100° C. under reduced pressure. Based on method of preparation, the resulting product was a polyester having terminal methyldiacetoxysilyl radicals attached to the polyester by silicon-carbon bonds through propyl urethane linkages.

A curable composition was prepared by stirring 100 parts of a polydimethylsiloxane having a viscosity of 3000 centipoises at 25° C. and terminal methyldiametoxysiloxy units, 25 parts of the above-described 1,2-propyleneglycoladipic acid polyester having terminal diacetoxymethylsilyl radicals, 15 parts of the process aid utilized in Example 1, and 21 parts of fume silica. A uniform blend was achieved by vigorously stirring the various components for 2 hours under substantially anhydrous conditions. Based on method of preparation, the blend was a curable composition composed of 25 parts of the methyldiacetoxy-terminated polyester, 21 parts of fume silica, and 15 parts of process aid, per 100 parts of the diacetoxymethylsiloxy terminated polydimethylsiloxane.

A portion of the above blend was poured onto a tin-plated steel plate and exposed to the atmosphere. After 35 minutes at an R.H. of 30 percent, a tack-free film was obtained. After 10 days, a slab of the resulting cured blend showed a tensile of 565 p.s.i., and an elongation of 430 percent. A cured slab obtained from a mixture free of the curable polyester which consisted of the above curable polydimethylsiloxane, filler and process aid showed a tensile of 300 p.s.i. and an elongation of 400 percent. A cured slab of the blend also showed a 537 tensile p.s.i. and an elongation percent of 273 after 28 days of heat-aging at 150° C. A cured slab obtained from the above curable polyester containing 10 percent by weight of fume silica was too brittle to test after 14 days.

In the table below shear strength (p.s.i.) was measured on a Tinius-Olson tester at a rate of 0.5 inch per minute. In measuring shear, the curable blend was spread onto an aluminum and plywood substrate to a height of about 0.02 inch, and a section of wire mesh screen was imbedded into the blend, and then covered with the curable blend to a height of about 0.02 inch. After the curable blend cured, the treated substrates and screens were then pulled in opposite directions at a predetermined rate. Table I below shows a comparison of the shear strength on aluminum and plywood of the curable blend compared to filled mixtures of the above-described curable polydimethylsiloxanes and polyester where the filled mixtures contained about 20 parts of fume silica per 100 parts of polymer.

TABLE I

| | Shear strength | |
| --- | --- | --- |
| | Aluminum | Plywood |
| Blend | 107 | 103 |
| Polydimethylsiloxane | 143 | 106 |
| Polyester | 45 | |

The slabs are measured with a photovoltmeter and light source for initial reflectance characteristics after two weeks cure in a substantially dust-free atmosphere. The slabs are then each uniformly sprinkled with about 2 grams of powdered silicon metal having an average particle size of 0.0027 microns and baked in an oven for 30 minutes at 160° F. The treated slabs are then sprayed with water at 35 p.s.i. and again measured for reflectance. The difference between the initial and later reflectance measurements shows that the slabs which have the highest values have the highest dirt pickup tendency. This is due to the surface oil which is associated on or near the surface of the slab as measured by the retained powdered silicon metal. It is found that the polyester has the lowest dirt pickup tendency and the blend is substantially better than the polydimethylsiloxane.

Example 3

The procedure of Example 2 was repeated except that there was utilized 100 parts of the diethylene glycol adipic acid polyester having terminal diacetoxymethylsilyl radicals per 100 parts of the polydimethylsiloxane having terminal diacetoxymethylsilyl units. Based on method of preparation, there was produced a curable blend comprising 100 parts of polyester having terminal methyldiacetoxysilyl radicals and 10.5 parts of filler per 100 parts of polydimethylsiloxane having terminal methyldiacetoxysiloxy units.

A portion of the above curable blend was poured onto an aluminum strip and exposed to atmospheric conditions. After 45 minutes a tack-free film was obtained. A slab cut from the cured blend after 10 days showed a tensile of 301 p.s.i., an elongation percent of 370 and a hardness of 26 (Shore A). After 3 days exposure in ASTM oil No. 3 at 100° C., the slab of the cured blend increased 17 percent in length. A 29 percent increase in length was obtained when a cured slab of the above-described curable polydimethylsiloxane was tested under the same conditions. A sample of the curable blend also remained unchanged after 6 months shelf period when it was kept in a sealed vial.

Example 4

There were added 16 parts of diacetoxymethylsilane to 184 parts of polybutadiene having a viscosity of about 50,000 centipoises at 25° C. The addition was performed at a temperature of 100° C. in the presence of 0.04 part of platinum in the form of a platinum-ethylene complex. The mixture was stirred and heated at 100° C. for about 7 hours before the mixture showed no silicon hydride adsorption based on its infrared spectrum. Based on method of preparation the resulting product was a polybutadiene polymer having chemically combined methyldiacetoxysilyl radicals. The mixture of 150 parts of the polybutadiene polymer and 60 parts of carbon black were mixed for 1 hour in the absence of moisture.

One-hundred and twenty parts of the resulting mixture of carbon black and polybutadiene polymer were mixed with 300 parts of a mixture of 246 parts of the methyldiacetoxysiloxy terminated polydimethylsiloxane of Example 1 and 54 parts of fume silica. Based on method of preparation, a curable blend was obtained having 41 parts of polybutadiene having chemically combined diacetoxymethylsilyl radicals, 18 parts of fume silica, per 100 parts of polydimethylsiloxane having terminal methyldiacetoxysiloxy units.

A portion of the above curable blend was poured onto a tin-plated steel panel and exposed to atmospheric conditions. A tack-free film was obtained in 45 minutes. A slab cut from the cured blend after 14 days showed a tensile of 337 p.s.i., an elongation of 283 percent and a hardness of 27 (Shore A). After 3 days immersion in ASTM oil No. 3 at 100° C. the slab showed about a 15 percent increase in length. A cured slab of the above-described curable polydimethylsiloxane showed a 25 percent increase in length when immersed in ASTM oil No. 3 under the same conditions.

Example 5

A blend of 75 parts of a silanol-terminated methylcyanoethylsiloxane composed of about 50 mole percent of methylcyanoethylsiloxy units and 50 mole percent of dimethylsiloxy units having a viscosity of about 45,000 centipoises at 25° C., 75 parts of a silanol terminated polydimethylsiloxane having a viscosity of about 3,000 centipoises at 25° C., 50 parts of fume silica, and 8 parts of methyltriacetoxysilane was mixed together for about 2 hours under substantially anhydrous conditions. Then 150 parts of the methyldiacetoxysilyl terminated polyester of Example 2 were added to the resulting mixture and it was agitated for an additional 2 hours. Based on method of preparation, the resulting curable blend was composed of 100 parts of methyldiacetoxysilyl terminated polyester of diethylene glycol adipic acid, 33 parts of filler, per 100 parts of an organopolysiloxane mixture composed of equal weight proportions of a methyldiacetoxysiloxy terminated polydimethylsiloxane and a methyldiacetoxysiloxy terminated methylcyanoethylsiloxane composed of 50 mole percent of chemically combined methylcyanoethylsiloxy units and dimethylsiloxy units.

A proportion of the above curable blend is poured onto a tin-plated steel panel under atmospheric conditions. A slab is cut from a cured sheet after the blend is allowed to remain exposed to the atmosphere for 7 days. The slab is immersed in ASTM oil No. 3 for 3 days at 100° C. The slab shows substantially improved resistance to swell as compared to a slab which is made by curing the same composition free of the polyester having terminal methyldiacetoxysilyl radicals.

Example 6

A curable blend was made by mixing together for about one hour under substantially anhydrous conditions, 90 parts of the polyester of Example 2 having terminal methyldiacetoxysilyl radicals with about 300 parts of a flowable mixture. The flowable mixture was composed of about 77 percent by weight of a polydimethylsiloxane having a viscosity of about 3000 centipoises at 25° C. and terminal methyldiacetoxysiloxy units and about 23 percent by weight of equal amounts of fume silica and the process aid utilized in Example 1. Based on method of preparation, the resulting curable blend was composed of about 38.5 parts of polyester having terminal methyldiacetoxysilyl radicals, and about 14 parts of fume silica per 100 parts of polydimethylsiloxane having terminal methyldiacetoxysiloxy units.

A slab cut from a cured sheet showed a tensile of 273 p.s.i. and an elongation of 3.45 percent.

Example 7

A mixture of 114 parts of 2,2-bis(4-hydroxyphenyl)-propane, 225 parts of a chlorine terminated polydimethylsiloxane having an average of about 19 chemically combined dimethylsiloxy units and 2.95 parts of 2-allylphenol was phosgenated until the mixture achieved a maximum viscosity. When the mixture had been completely phosgenated as indicated by the presence of phosgene in the exit gases, 5 parts of 2-allylphenol were added to react with any terminal chlorocarbonate groups and unreacted phosgene. Based on method of preparation there was obtained a copolymer having terminal 2-allylphenol carbonate linkages composed of polydimethylsiloxane blocks joined to polycarbonate blocks by aryloxy silicon linkages.

A mixture of 25 parts of the above copolymer, 650 parts of dry benzene, 39 parts of methyldiacetoxysilane and 0.014 part of platinum in the form of a platinum-alcoholate catalyst was heated for a period of 6 hours until the infrared spectrum of a portion of the mixture indicated no further presence of silicon hydride. An additional 0.004 part of platinum was added and the mixture was heated for 10 hours. Based on method of preparation there was obtained a curable polydimethylsiloxane-polycarbonate copolymer composed of polydimethylsiloxane blocks and polycarbonate blocks having terminal methyldiacetoxysilyl radicals.

A mixture of 200 parts of a curable blend composed of about 77 percent by weight of polydimethylsiloxane having terminal methyldiacetoxysiloxy units utilized in Example 2, and 23 percent by weight of equal amount of fume silica and the process aid utilized in Example 1, was mixed with 100 parts of a 31 percent solution in benzene of the above polydimethylsiloxane-polycarbonate copolymer having terminal methyldiacetoxysilyl radicals.

After the mixture was stirred for 1 hour, the benzene was removed under reduced pressure. Based on method of preparation a curable blend was obtained composed of 20 parts of the polydimethylsiloxane-polycarbonate copolymer, 15 parts of fume silica, per 100 parts of the polydimethylsiloxane having terminal methyldiacetoxysiloxy units.

A cured slab of the above-described curable blend showed a tensile of 444 p.s.i., an elongation of 267 percent and a hardness of 35 (Shore A).

Example 8

There are added under substantially anhydrous conditions, 15 parts of methyltriacetoxysilane to a mixture of 25 parts of fume silica and 250 parts of a silanol-terminated methyltrifluoropropylpolysiloxane composed of about 90 mole percent of chemically combined methyltrifluoropropylsiloxy units chemically combined with about 10 mole percent of dimethylsiloxy units having a viscosity of about 10,000 centipoises at 25° C. The resulting mixture is mixed thoroughly in the substantial absence of moisture for about two hours. There are then added 100 parts of the polyester of Example 2 and the resulting mixture is blended for an additional thirty minutes. Based on method preparation, the resulting mixture is a curable blend composed of about 38 parts of polyester having terminal methyldiacetoxysilyl radicals and about 9.6 parts of fume silica, per 100 parts of the methyltrifluoropropylpolysiloxane having terminal methyldiacetoxysiloxy units.

A portion of the above curable blend is poured onto an aluminum panel and a wire mesh screen is imbedded into the blend as described in Example 2, and allowed to cure under atmospheric conditions. A portion of the above-described mixture of the silanol terminated methyltrifluoropropylpolysiloxane, methyltriacetoxysilane and fume silica which had been mixed for two hours under substantially anhydrous conditions also is poured onto an aluminum panel and is also imbedded with a wire mesh screen. A shear test in accordance with Example 2 shows that the cured slab made from the blend has a higher shear strength than the slab made from the methyltrifluoropropylpolysiloxane.

Example 9

There were added slowly 657.4 parts of 2,4-toluenediisocyanate to 2500 parts of a mixture at 100° C. of polyethylene glycol terminated polypropylene glycol having a molecular weight of about 1300 and 1000 parts of toluene. After the addition, the mixture was heated for an additional hour at 100° C. There were then added 0.14 part of dibutyltindilaurate followed by 218.8 parts of allyl alcohol. When the infrared spectrum of the mixture showed the absence of isocyanate, 2.2 part of a platinum-alcoholate complex was added, followed by 611.3 parts of methyldiacetoxysilane. The mixture was then stripped of toluene. The product had a viscosity of 3 million centipoises at 25° C. Based on method of preparation, the product was a polypropylene glycol having terminal diacetoxysilyl radicals joined by propylurethane-arylurethane linkages.

A cured slab made from a curable blend of 15 parts of the above curable polypropylene glycol, 21 parts of fume silica per 100 parts of a polydimethylsiloxane having a viscosity of 3000 centipoises at 100° C. and terminal methyldiacetoxy units was compared to a slab made from the same blend free of the curable polypropylene glycol. A comparison was made of the cured materials with respect to adhesion to aluminum and plywood as shown in Example 2. The plywood shear test was run the same as the aluminum shear test. As shown by Table II below, "blend" which represents the mixture of curable glycol and curable polydimethylsiloxane, is compared to the curable polydimethylsiloxane.

TABLE II

| | Aluminum | Plywood |
|---|---|---|
| Blend | 86 | 82 |
| Polydimethylsiloxane | 72 | 65 |

Example 10

There were added 4 parts of the mixture of fume silica and the curable polydimethylsiloxane of Example 9, to the curable polyglycol of Example 9. The resulting curable blend contained 30 parts of fume silica, 500 parts of curable polyglycol, per 100 parts of the curable polydimethylsiloxane.

A visual observation was made of the flow characteristics at room temperatures over a period of thirty minutes of the above blend and the polyglycol-filler mixture free of the curable polydimethylsiloxane. A bead of the curable blend flowed 1.5 times its original diameter on a 60° incline while a bead of the curable polyglycol-filler mixture remained substantially unchanged.

Example 11

A blend of 100 parts of a copolymer having terminal methyldiacetoxysiloxy units and an average of about 300 chemically combined siloxy units consisting of about 5 mole percent of diphenylsiloxy units and 95 mole percent of dimethylsiloxy units was mixed together for about 2 hours with 30 parts of fume silica and 60 parts of the polyester of Example 2 having terminal methyldiacetoxysilyl radicals. A cured slab which was obtained by exposing the curable blend under atmospheric conditions, showed a tensile of 351 p.s.i., an elongation of 87 percent, and a hardness of 25 (Shore A).

Based on the above results, those skilled in the art would know that the curable compositions or blends of the present invention which can contain from 5 to 500 parts of curable organic polymer per 100 of curable organopolysiloxane provide for significantly improved products as compared to the characteristics of the products obtained from either the curable organic polymer or the curable organopolysiloxane. Cured products obtained from the curable composition of the present invention, for example, show substantially improved resistance to the effects of swelling in organic solvents as compared to standard cured organopolysiloxanes while at the same time show superior resistance to the effect of heat-age as compared to products obtained from organic polymers. The products provided by the present invention also have improved paintability as well as adhesion to aluminum and plywood as shown by the above results in Tables I and II. Further benefits are demonstrated with respect to flow characteristics as well as substantially reduced dirt pick-up, as compared to products produced from conventional curable organopolysiloxanes.

While the foregoing examples have of necessity been limited to only a few of the very man variables within the scope of the present invention, it should be understood that the present invention covers a broad class of curable compositions or blends of organopolysiloxane polymers and organic polymers having terminal radicals of Formula 1.

The examples also have of necessity been directed to a few of the many process variables which can be utilized in producing the curable compositions of the present invention. It should be understood however, that the curable compositions of the present invention can be made from components which are produced by methods previously described in specific examples given as well as by a detailed description of the present invention which preceded these examples.

Although methods for making the preferred curable materials are shown above in the examples, some of the curable organopolysiloxane having radicals of Formula 1 also can include polymers made by adding silicon hydride of Formula 6 to organopolysiloxane having terminal radicals of the formula,

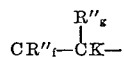

Some of these latter materials can be made by reacting aliphatically unsaturated isocyanates with the organopolysiloxanes of Formula 9. In addition, curable organic polymer also can include materials made by utilizing silanes of Formula 4 in combination with hydroxy containing organic polymer previously described.

What I claim as new and desire to secure by Letters Patent of the United States is:

1. Room temperature vulcanizable compositions comprising (A) 100 parts of a curable organopolysiloxane consisting essentially of from 1 to 10,000 chemically combined units of the formula,

(B) from about 5 to 500 parts of a curable organic polymer having a molecular weight of up to 12,000 selected from polyesters, polyethers, aliphatically unsaturated hydrocarbon homopolymers, aliphatically unsaturated halogenated hydrocarbon homopolymers, aliphatically unsaturated organic copolymers, organopolysiloxane-polycarbonate copolymers, polycarbonate polymers, and mixtures thereof, and (C) from 0 to about 100 parts of filler, where said curable organopolysiloxane polymer and said curable organic polymer have chemically combined silyl radicals of the formula,

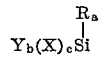

where R is a member selected from the class consisting of hydrocarbon radicals and halogenated hydrocarbon radicals, R' is selected from the class consisting of monovalent hydrocarbon radicals, halogenated monovalent hydrocarbon radicals and cyanoalkyl radicals, Y is a monovalent radical selected from the class consisting of acyloxy radicals, ketoximato radicals, amino radicals, and aminoxy radicals, X is selected from the class consisting of halogen radicals, alkoxy radicals and Y radicals, $a$ is an integer equal to 0 to 2, inclusive, $b$ is an integer equal to 1 to 3, inclusive, $c$ is equal to 0 or 1, and the sum of $a$, $b$, and $c$ is equal to 3.

2. A composition in accordance with claim 1, where the organic polymer is a polyester.

3. A composition in accordance with claim 1, where the organic polymer is a polyether.

4. A composition in accordance with claim 1, where the organic polymer is an organopolysiloxane-polycarbonate copolymer.

5. A composition in accordance with claim 1, where the organic polymer is an aliphatically unsaturated hydrocarbon homopolymer.

6. A composition in accordance with claim 1, where said curable organopolysiloxane polymers have chemically combined silyl radicals with acyloxy radicals attached to silicon.

7. A composition in accordance with claim 1, where said curable organopolysiloxane is a curable polydimethylsiloxane.

8. A composition in accordance with claim 1 containing from 0 to 30 parts of fume silica.

9. A composition in accordance with claim 1 comprising from 15 to 100 parts of said curable organic polymer per 100 parts of said curable organopolysiloxane.

10. A composition in accordance with claim 1, where the organic polymer is an aliphatically unsaturated copolymer of butadiene and acrylonitrile.

References Cited

UNITED STATES PATENTS

| | | |
|---|---|---|
| 3,021,292 | 2/1962 | Hurd. |
| 3,271,362 | 9/1966 | Chalk et al. |
| 3,317,461 | 5/1967 | Plueddemann. |
| 3,355,526 | 11/1967 | Molnar. |

FOREIGN PATENTS 653,701  3/1965  Belgium.

MORRIS LIEBMAN, *Primary Examiner.*

L. T. JACOBS, *Assistant Examiner.*

U.S. Cl. X.R.

260—825